(United States Patent [19])

Haberkorn

[11] Patent Number: 4,743,151
[45] Date of Patent: May 10, 1988

[54] STRUCTURE AND METHOD FOR UNITIZING AND BRACING A LOAD IN A TRAILER

[76] Inventor: Robert W. Haberkorn, 8809 Prestwick La., Orland Park, Ill. 60462

[21] Appl. No.: 923,626

[22] Filed: Oct. 27, 1986

Related U.S. Application Data

[63] Continuation-in-part of Ser. No. 660,362, Oct. 12, 1984, abandoned.

[51] Int. Cl.⁴ .............................................. B60P 7/14
[52] U.S. Cl. ...................................... 410/121; 410/34; 410/129
[58] Field of Search ........................ 410/121, 127–129, 410/140, 32, 34

[56] References Cited

U.S. PATENT DOCUMENTS

| | | | |
|---|---|---|---|
| 1,499,229 | 6/1924 | Laffey | 410/129 |
| 2,166,918 | 7/1939 | McMullen et al. | 410/129 |
| 2,514,466 | 7/1950 | Bildhauer | 410/129 |
| 2,812,728 | 11/1957 | Reheis | 410/121 |
| 2,819,688 | 1/1958 | Hall | 410/129 |
| 2,895,431 | 7/1959 | Ford | 410/129 |
| 3,964,608 | 6/1976 | Rowley | 410/127 |
| 4,498,824 | 2/1985 | Kinkle | 410/121 |

Primary Examiner—Robert R. Song
Attorney, Agent, or Firm—Wood, Dalton, Phillips, Mason & Rowe

[57] ABSTRACT

A structure for unitizing loads including a pair of gates disposed at opposite ends of the load where each of the gates have a plurality of vertically spaced openings at their upper ends. A strap is looped around the gates to unitize a load therebetween, and the strap is extended through a selected one of the openings on each gate so as to extend substantially along the top of the load. A method is also disclosed for unitizing a load wherein a trailer is loaded with gates positioned at opposite ends of the load and straps looped around the gates, said straps extending along the floor on one leg of the loop and along the top of the load along the opposite leg of the loop. The invention also contemplates load bracing structure with a gate having a load engaging face and an oppositely facing mounting face. Gate supporting structure acts between the mounting face and the load supporting surface to rigidly mount the gate in upright situation on the support so as to brace the load through the load engaging gate face. The invention also contemplates a method of assembling the load bracing structure.

9 Claims, 5 Drawing Sheets

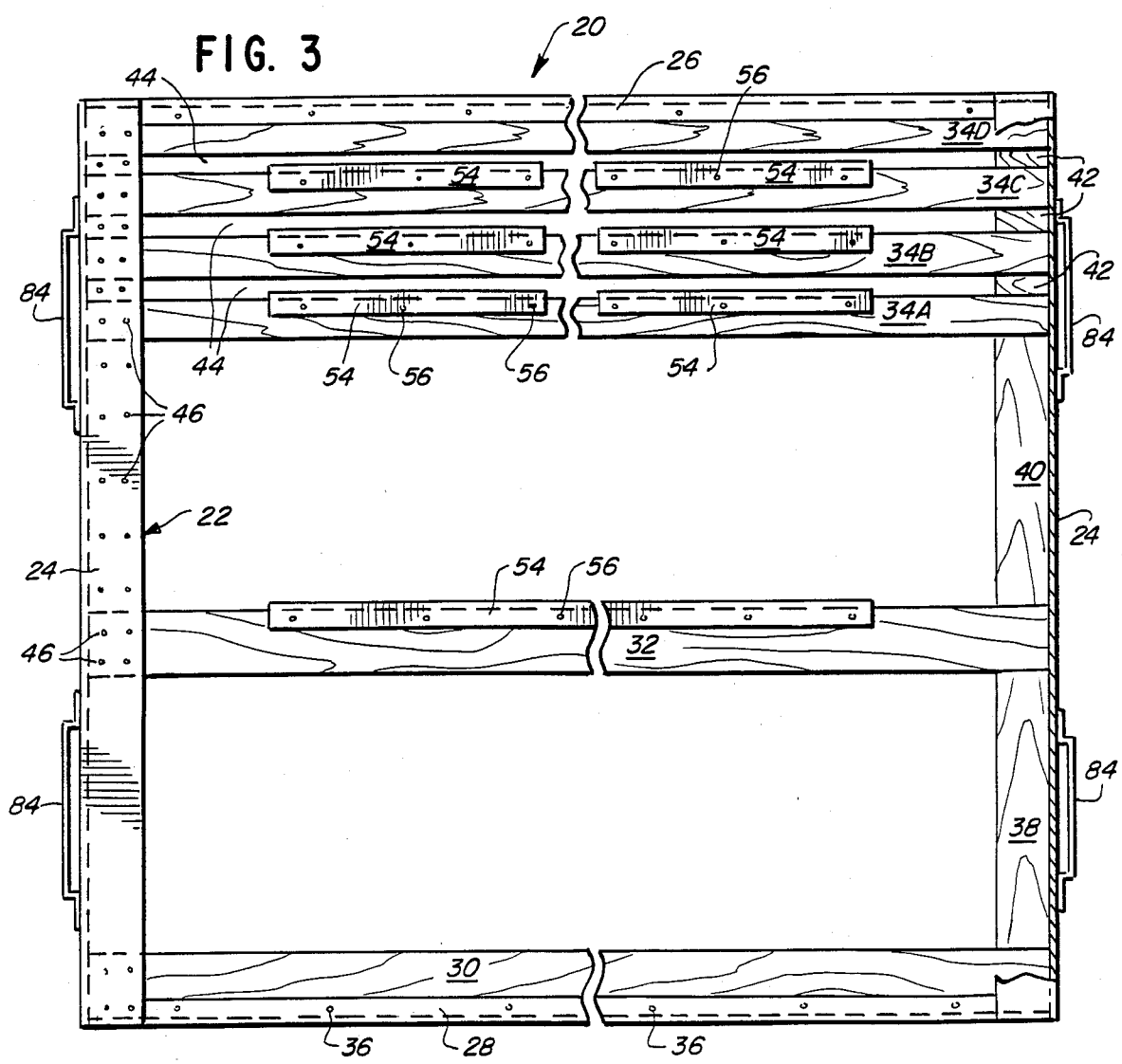

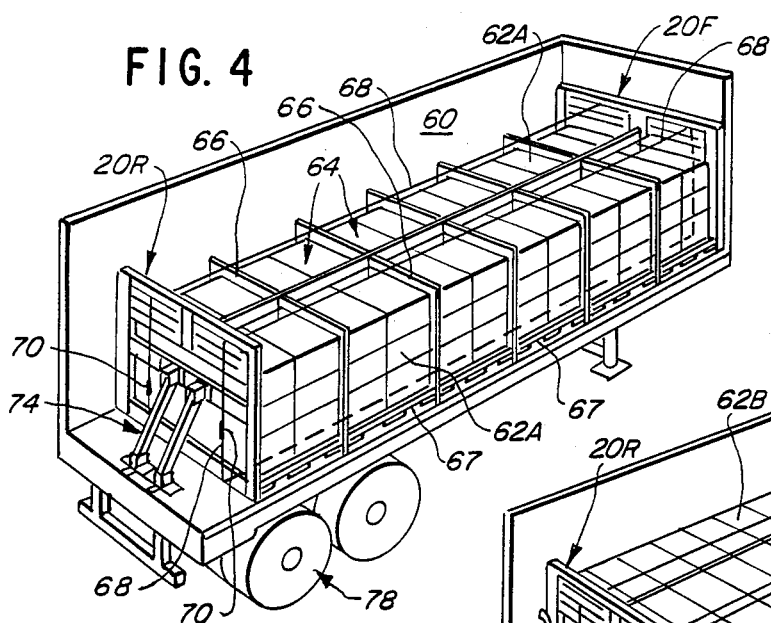
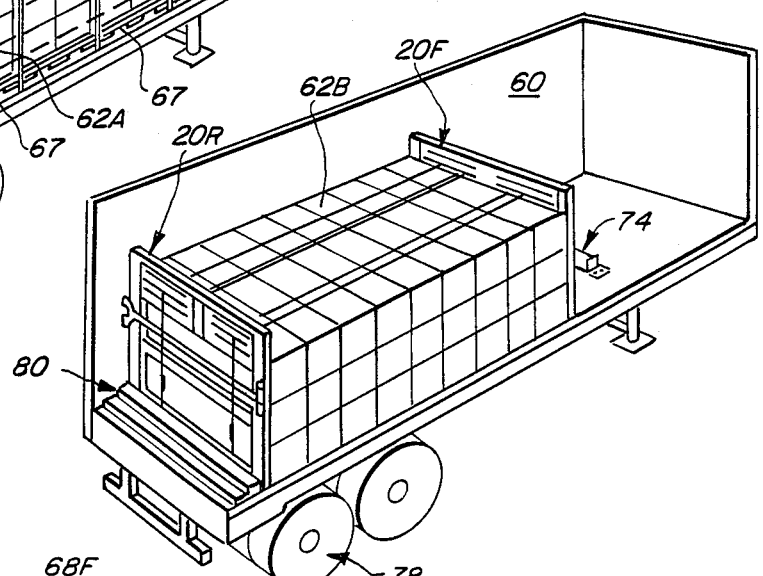
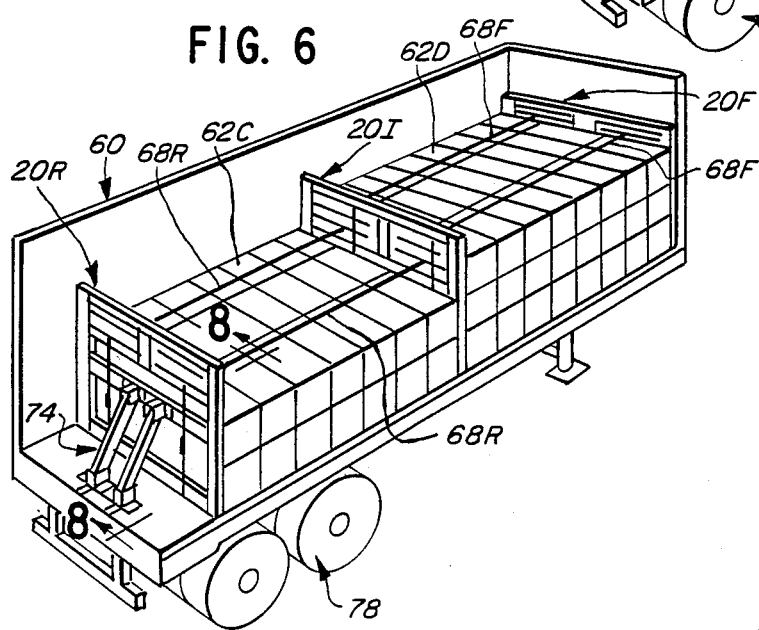
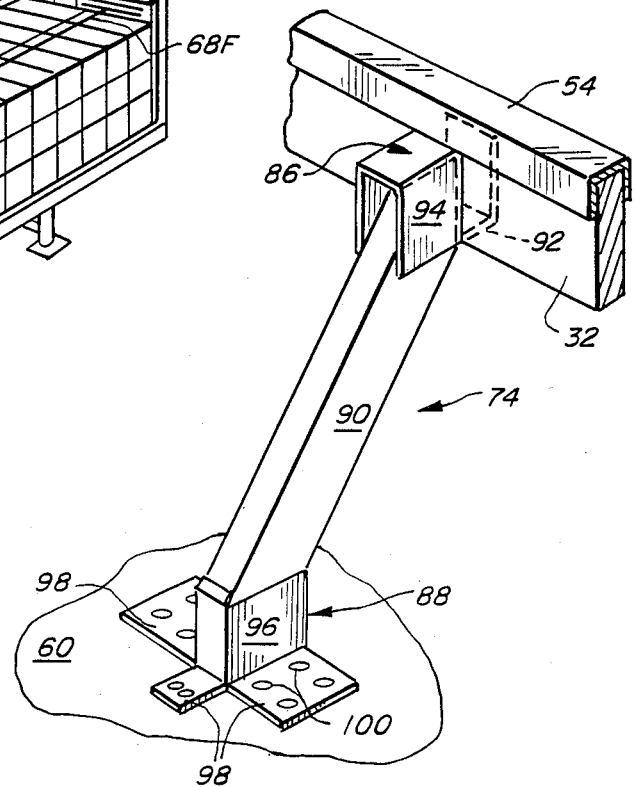

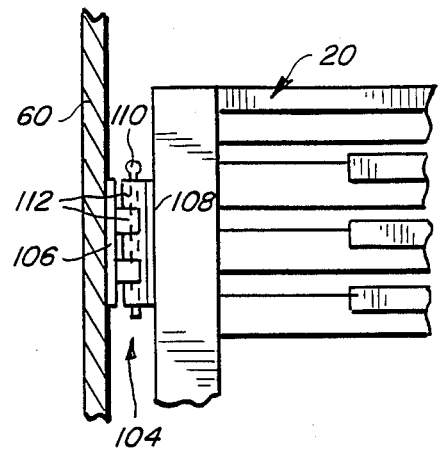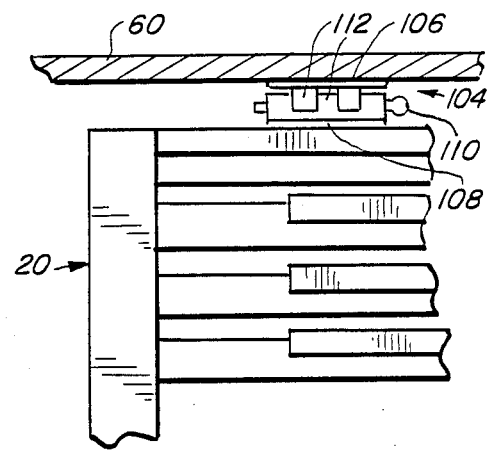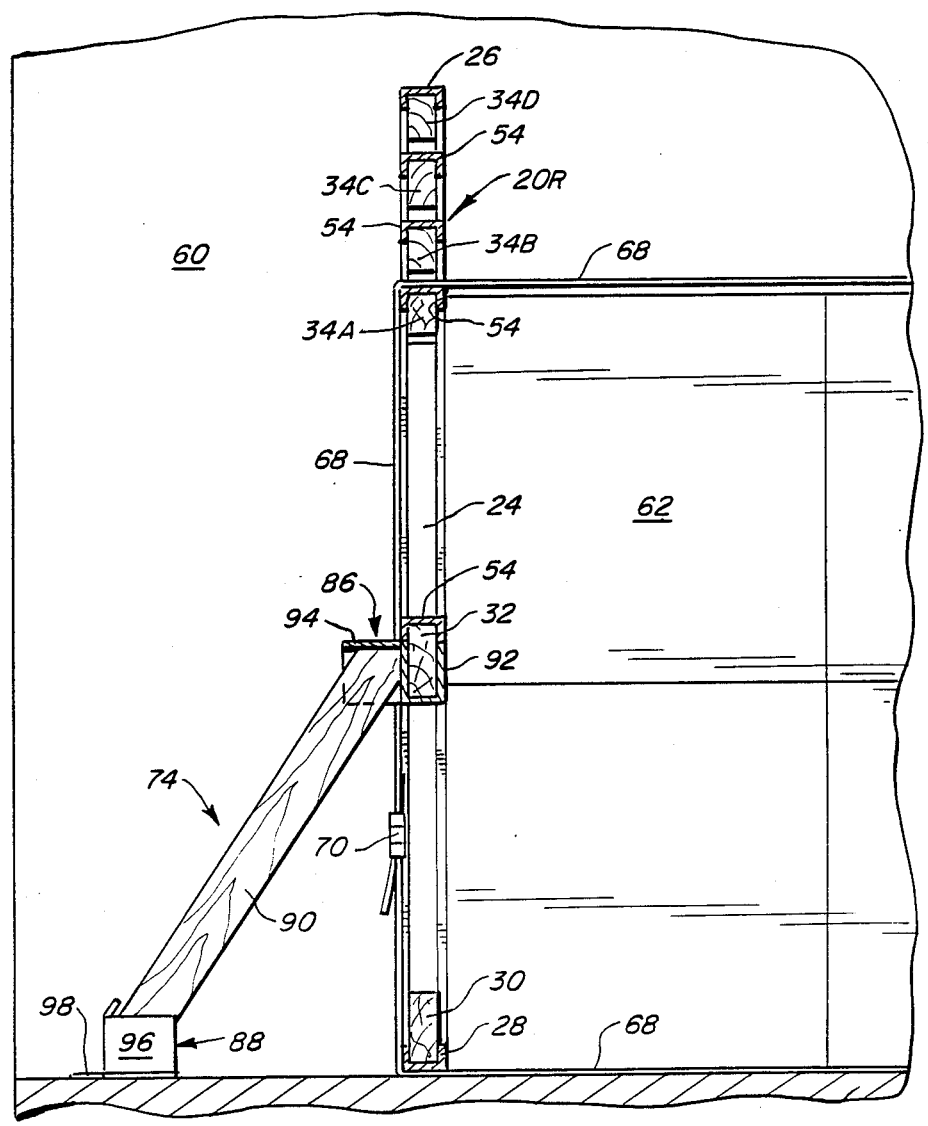

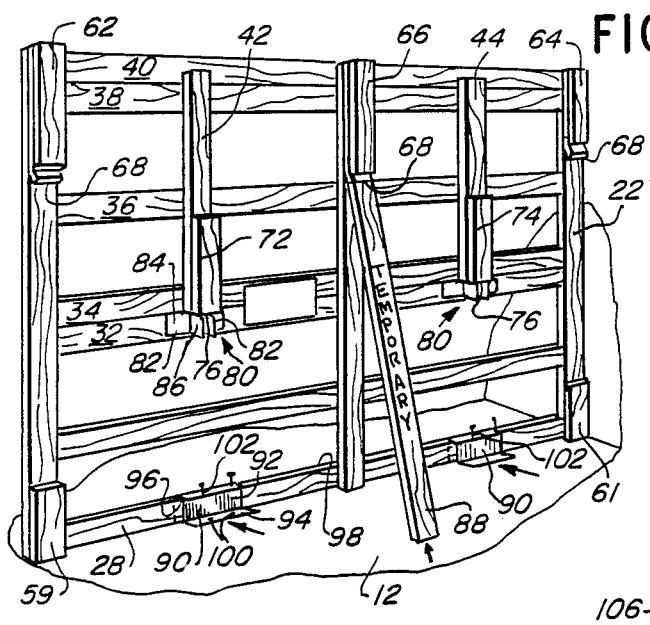

STRUCTURE AND METHOD FOR UNITIZING AND BRACING A LOAD IN A TRAILER

CROSS-REFERENCE

This application is a continuation-in-part of Ser. No. 660,362 filed Oct. 12, 1984, now abandoned.

BACKGROUND OF THE INVENTION

1. Field of the Invention

This invention relates to a structure and method for unitizing and bracing loads and, more particularly, to a structure and method for unitizing and bracing loads in moving vehicles such as truck trailers.

2. Background Art

The desirability for unitizing loads during transport is well-known. Glass items, including liquid containers, are particularly susceptible to breaking as a result of being bumped around during transport. Railroads today are paying out large claims for damages resulting from cargo shifting on piggyback trailers. By unitizing loads, the shifting of the loads can be minimized during transport, and therefore damage to parts of the load resulting from bumping about in the transport vehicle can be reduced.

One method which has been used is to place straps around the load as shown in U.S. Pat. No. 1,920,917, to Scales. However, the structure disclosed in this patent for unitizing such loads is not readily adaptable to loads of different heights. Therefore, the straps of such structures bear against the edges of the loads, and thereby damage the loads. Such damage is extremely undesirable when the load is in its consumer packaging, such as 12 packs of beer.

Another problem with the Scales structure is that it is directed principally to unitizing a load and does not effectively make provision for bracing the load against shifting on the load bearing surface.

Structure to prevent the shifting of a load in a moving vehicle is shown in U.S. Pat. No. 4,193,736, to Thomaswick. Thomaswick discloses a pair of spaced deck runners with a stanchion and lash bar attached to the runners adjustably along the length thereof. Loads are unitized and confined between the stanchion and lash bar. The Thomaswick structure is complicated and, to be effective, must have runners extending the entire length of a load supporting surface to which it attaches. Such a structure takes up valuable space in vehicles and, because of its weight, reduces payload.

Further, the stanchion in Thomaswick takes up a substantial amount of space lengthwise of the runners. In certain situations it is impossible to incorporate the Thomaswick structure into a vehicle. For example, if the load extends to within approximately two feet of the rear wall of the carrying vehicle, bracing of the load against rearward shifting may be required, however the Thomaswick structure would not fit within the allowed space. Further, by reason of the complicated nature of the Thomaswick structure, its manufacture is relatively involved and costly.

Still other structures have been used such as airbags to fill the empty spaces in the transport vehicle. However, these structures can be dangerous as they are placed in relatively high pressures and can sometimes force the transport vehicle doors open, striking any individual standing nearby. Still further, the airbags are expensive and difficult to use.

The present invention is directed toward overcoming one or more of the problems as set forth above.

SUMMARY OF THE INVENTION

In one aspect of the present invention, a structure for unitizing loads is disclosed including a pair of gate members disposed at opposite ends of the loads where each of the gate members have a plurality of vertically spaced openings at their upper ends. A strap is looped around the gate members to unitize a load therebetween, and the strap is extended through a selected one of the openings on each gate member so as to extend substantially along the top of the load.

In another aspect of the present invention, a method is disclosed for unitizing a load wherein a trailer is loaded with gate members positioned at opposite ends of the load and straps looped around the gate members, said straps extending along the floor on one leg of the loop and along the top of the load along the opposite leg of the loop.

An object of the present invention is to allow for loads to be unitized in all three dimensions so as to minimize the motion during transport. Another object of the present invention is to provide a unitizing structure which will not damage the edges of the load. A further object of the present invention is to provide a unitizing structure which is readily adaptable to use with loads of different heights. Still another aspect of the present invention is to provide a unitizing structure and method of installing that structure which is safe and simple to use. Another object of the present invention is to unitize and secure loads so as to render the loads more inaccessible to thieves.

A further aspect of the invention is the provision of load bracing structure to prevent shifting of a load on a bearing surface for the load. In one embodiment a gate is provided having a load engaging face, a mounting face facing oppositely to the load engaging face and an upwardly facing surface. The gate is positioned with the mounting face against a load to be braced. A bracket is placed against the upwardly facing surface of the gate and attached to the support. A block having a shoulder is attached to the load bearing surface with the shoulder abutted to the bottom region of the gate. An elongate long leg support has its one end attached to the gate mounting face at the top region of the gate and its other end attached to the load bearing surface at a location spaced from the mounting face. An elongate short leg support has its one end attached to the gate mounting face beneath the point of attachment of the one end of the long leg support and its other end attached to the support surface at a location spaced from the mounting face.

The invention structure cooperates with the load bearing surface to rigidly and positively brace a load. The bracket and block cooperatively prevent shifting and separation of the bottom portion of the gate from the load bearing surface. The leg supports positively brace the gate above the support surface.

The invention structure can be made principally from wood and is readily adaptable to conventional style moving vehicles such as trucks, train cars, etc. Each structure is simple to assemble on site regardless of the location and size of the load within the carrying vehicle.

Another aspect of the invention is a method of assembling the aforementioned structure. Initially, the gate is placed against a load and the bracket is placed against the upwardly facing surface of the gate and attached to the load bearing surface. A temporary brace with spaced ends can be interposed between the gate mounting face at the top portion of the gate and a support surface at a location spaced from the mounting face. While exerting a pressure on the top portion of the gate against the load, the long leg supports are attached. The short leg supports are attached while exerting a similar force on the bottom region of the gate.

In tight spaces, the structure can be slightly modified for space efficiency. The modified structure according to the invention comprises the aforementioned gate and associated bracket. Instead of having angularly disposed leg supports, blocks are attached to the gate mounting face in cantilever fashion at the top and bottom region of the gate. The leg supports are attached to the free ends of the block and to the load bearing surface at locations spaced from the gate mounting face in substantially vertical orientation. The blocks projecting from the mounting face are cut to length depending on the amount of space available.

In a preferred form, two blocks are provided at the top region of the gate, with each having associated vertically extending leg supports attached thereto. A horizontal brace spans and is connected to each of the leg supports.

The invention also contemplates a method of assembling the modified gate structure substantially in the same manner as the assembly is contemplated for the previously described embodiment.

BRIEF DESCRIPTION OF THE DRAWINGS

FIGS. 1 and 2 are perspective views showing gates for unitizing loads;

FIG. 3 is a partial perspective partially broken view of the gate of FIG. 2;

FIGS. 4–6 are perspective partially broken views showing trailers having loads therein unitized by the present invention;

FIG. 7 is a perspective view showing a floor block brace usable with the present invention;

FIG. 8 is a cross-sectional view taken along line 8—8 of FIG. 6;

FIGS. 9 and 10 are partial views showing gates of the present invention hinged to a trailer;

FIG. 11 is a perspective view of a load bracing structure according to the present invention;

FIGS. 12–15 show the steps for sequentially constructing the load bracing structure in FIG. 11 according to the invention;

DESCRIPTION OF THE PREFERRED EMBODIMENT

Figure 17:
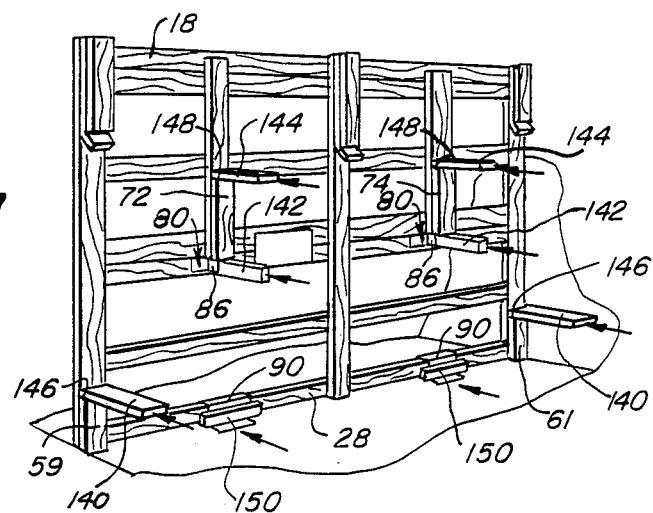
FIGS. 17–19 show the steps for sequentially constructing the load bracing structure in FIG. 16 according to the invention.

A gate 20 usable to securely unitize a load in, for example, a trailer is illustrated in FIGS. 1–3. The outer frame 22 of the gate comprises two channel-shaped uprights 24 spaced apart by a top channel member 26 (open downwardly) and a bottom channel member 28 (open upwardly). The uprights 24 and channel members 26, 28 are preferably made of metal such as 20-gauge galvanized steel.

A plurality of wood cross members 30, 32, 34A-D also extend between the uprights 24 to provide stability and aid in securing loads of various heights. A bottom cross member 30 is secured in the bottom channel member 28 by suitable means such as nails 36. Wood spacers 38 in the uprights 24 locate the central cross member 32 at an intermediate height in the gate 20. Yet another pair of spacers 40 in the uprights 24 locate the lowestmost 34A of the upper cross members. Pairs of relatively short spacers 42 locate the remaining upper cross members 34B-D, the top one 34 D of which is located in the top channel member 26. The short spacers 42 thereby define openings 44 between the upper cross members 34A-D for a purpose which will hereafter be apparent.

The various cross members 30, 32, 34A-D and spacers 38, 40, 42 are secured to the outer frame 22 of the gate 20 by suitable means such as nails 46. Therefore, cleats or other special structures are not needed to join wood parts together.

The upper cross members 34A-D also include in the center a set of reinforcing spacers 48 and a pair of reinforcing plates 50 suitably secured thereto by nails 52. As will be apparent, this reinforcement helps the upper cross members 34A-D bear the vertical and horizontal loads which they encounter during use.

Located at the top of the center cross member 32 and all but the top upper cross members 34A-C are surface reinforcing members 54 which are in the space of downwardly opening channels. These reinforcing members 54 are also secured to the cross members 32, 34A-C by suitable means such as nails 56.

Use of these gates 20 in unitizing various loads is illustrated in FIGS. 4–6. For example, a trailer 60 having a load 62A divided into various compartments 64 by dividers 66 is shown unitized in FIG. 4. The load 62A is shown positioned on pallets 67 as is commonly the case to facilitate loading and unloading by forklifts. In such cases, the present invention is particularly valuable since individual pallets are somewhat susceptible to sliding in view of the relatively small surface area resting on the floor.

A pair of straps 68 are looped around the gates 20F, 20R at opposite ends of the load 62A. The straps 68 may be plastic or metal depending upon the weight of the load 62A being unitized.

The straps 68 are formed in a right loop by using a suitable winch (not shown) and are then crimped with steel clamps 70 (see particularly FIG. 8) affixed thereto. The straps 68 are extended through the opening 44 (see FIGS. 1–3) above that upper cross member 34 which is the height of the top of load 62A which, in the trailer 60 shown in FIG. 4, is the height of the divider 66. This ensures that the straps 68, which are under high amounts of tension, are not forced to bend around the edge of the load 62A since this would cause damage to the load at that edge. Further, by preventing the strap from being spaced any great distance from the top of the load, the bending forces which might otherwise be introduced in the top of the gates 20 are minimized so that a relatively uniform pressure is applied at the top and bottom of the load 62A. Large bending forces would tend to squeeze the top of the load 62A more than the bottom, which could also damage the load 62A. Still further, the straps 68 themselves by being spaced close to the top of the load 62A also unitize the load vertically (i.e. prevent bounding of parts of the load 62A when transported over rough surfaces).

When transporting loads 62A which shift easily, a floor block brace structure 74 may be used. This brace structure 74 is illustrated particularly in FIGS. 7 and 8 and is described further below. Where it is desirable to locate heavy loads 62B over the rear wheels 78 of the trailer 60, the floor block brace structure 74 can be used to locate the forward gate 20F at a position spaced from the front of the trailer 60 as shown in FIG. 5. Other supports such as the rear floor blocks 80 shown in FIG. 5 can also be used.

Where the trailer 60 will be hauling two different loads 62C, 62D of different heights, additional gates may be used as shown in FIG. 6 where an intermediate gate 20I is located between the loads 62C, 62D. The intermediate gate 20I operates as the front gate for the rear load 62C and the rear gate for the front load 62D. The straps 68F, 68R unitizing the front and rear loads 62D, 62C can therefore be looped at the appropriate height for each load 62C, 62D. Additionally, the entire load 62C, 62D in the trailer 60 is unitized through the use of the shared intermediate gate 20I.

Even where the load height is uniform, use of intermediate gates is valuable in providing added support for highly mobile or hazardous chemical loads.

Loads may be further secured by the use of horizontally looped straps (not shown) where desirable. Strap guides 84 (see FIG. 3) are provided on both sides of the gates 20 to support straps looped in this manner.

The floor block brace structure 74 is shown in FIGS. 7-8 and includes a gate bracket 86, a floor bracket 88 and a brace member 90. The gate bracket 86 includes a channel portion 92 which fits over the bottom of the gate central cross member 32 and also includes a pocket 94 within which one end of the brace member 90 fits. The floor bracket 88 has a pocket 96 for the other end of the brace member 90 and three flanges 98 having holes therein through which nails 100 may be driven into the floor of the trailer 60 to secure the floor bracket 88.

The floor bracket brace structure 74 may thus be installed as follows. When the gate (20R in FIG. 8) is in the desired position, the gate bracket 86 is fit over the central cross member 32 and the brace member 90 is wedged up into the gate bracket 86. Due to the upward action of the brace member 90, it is unnecessary to nail or otherwise secure the gate bracket 86 to the gate 20R. The floor bracket 88 is then fit over the brace member 90 and nailed to the floor at a location where the gate 20 and floor brackets 86, 88 fit snugly against the opposite ends of the brace member 90.

FIGS. 9 and 10 illustrate detachable hinges 104 which may be used to mount the gates 20 to the sides (FIG. 9) or roof (FIG. 10) of a trailer 60. Each hinge 104 includes a trailer leaf 106 mounted to the trailer 60 and a gate leaf 108 mounted to the gate 20. A removable pivot pin 110 extends through the knuckles 112 of the leaves 106, 108.

The hinges 104 therefore enable extra gates 20 to be securely carried in the trailer 60. Different numbers of gates 20 are needed as loads are picked up and dropped off. When a gate 20 is not needed, it may be pivoted out of the way against the side or roof of the trailer 60. When it is needed, the gate 20 may be placed across the trailer 60 and the pivot pins 110 removed so that the gate 20 may be moved longitudinally in the trailer 60 to the desired position.

The above-described unitizing structure may be installed as follows. The front gate 20F is located at the desired position, either against the front of the trailer 60 (e.g. FIG. 4) or against a floor block brace structure 74 (e.g. FIG. 5). Two or more straps 68 are then looped so that one end passes under the bottom cross member 30 of the front gate 20F and the other end passes over either the central cross member 32 (for very short loads) or the upper cross member 34A-D which is at the height which the load 62 will reach. Horizontally looped straps may also be strung through the strap guides 84 where desired.

The ends of the straps 68 under the bottom cross member 30 are then laid out longitudinally on the floor of the trailer 60 and the other ends are supported out of the way so that they stay above the load 62 which is then placed in the trailer 60. Fillers (not shown) can be used to fill lateral spaces if necessary (e.g. when the load 62 is not as wide as the trailer 60).

After the trailer 60 is loaded, the rear gate 20R is placed immediately behind the load 62 and the ends of the straps 68 are extended under its bottom cross member 30 and the appropriate central or upper cross member 32, 34A-D. A winch is then used to tighten the straps 68 around the load 62 and the strap ends are appropriately secured together, as by crimping and affixing steel clamps 70.

Appropriate block structures, such as the floor block brace structure 74 illustrated in FIGS. 7 and 8 or the rear floor blocks 80 illustrated in FIG. 5 may then be mounted against the rear gate 20R to prevent rearward shifting.

A load bracing structure according to the present invention is shown generally at 10 in FIG. 11 attached to a load bearing support surface 12. The load bracing structure 10 has application in trailers, train cars and the like wherein loads are supported on a surface and shifting of the loads is to be prevented. The load bracing structure comprises generally a gate 14 with a load engaging face 16, an oppositely facing mounting face 18 and gate bracing structure generally at 20 to maintain the gate 14 fixedly upright against the support surface 12.

The gate 16 comprises three full length uprights 22, 24, 26 with seven horizontal cross pieces 28-40 spanning the distance between the outer uprights 22, 26 and attached to all three uprights 22, 24, 26 to define an overall rectangular configuration for the gate. Partial vertical uprights 42, 44 are located between uprights 26 and 24 and uprights 24 and 22 respectively and are attached to the top cross piece 38, central cross piece 34 and intermediate cross piece 36. The uprights 22, 24, 26, 42, 44 and horizontal cross pieces 28-40 are preferably made from wood that is nominally dimensioned two inches by four inches. However, the nature of the material, the dimensions thereof and the specific arrangement can vary depending on the particular application. It is important, however, to afford a load engaging face 16 on the gate that has sufficient load contact area to adequately brace the load.

The gate 14 is held against the surface 12 and braced cooperatively by brackets 46, 48, three elongate long leg supports 50, 52, 54 extending angularly between the support surface 12, at a location spaced from the mounting face 18, and the uprights 22, 24, 26 at the top region 56 of the gate 14, and short, elongate leg supports 58, 60 extending between the support surface at a location spaced from the mounting face of the gate and the cross piece 32 at an intermediate height on the gate immediately beneath the partial uprights 42, 44. The structure can best be understood by describing its construction, which is shown sequentially in FIGS. 12-15.

The gate 14 is initially constructed and is universal in nature. The gate frame, comprising uprights 22, 24, 26, cross pieces 28-40 and partial uprights 42, 44 is initially assembled in the depicted configuration as by nails or other suitable structure. Corner pads 59, 61 and 62, 64 are provided at the bottom and top gate corners, respectively, to rigidify the connection of the uprights and cross pieces at the corners and serve a supporting function in the FIG. 16 embodiment as described below. A central pad 66 is mounted on the upright 24 and has the same configuration as the top corner pads 62, 64. Each of the pads 62, 64, 66 has an angularly disposed leg abutting surface 68 to facially engage the free end 70 of one of the long leg supports 50, 52, 54. Each partial upright 42, 44 has an associated pad 72, 74 respectively, with a downwardly facing surface 76 for abutting a free end 78 of the short leg supports 58, 60.

The cross piece 32 carries two, two-piece brackets at 80 immediately beneath the uprights 42, 44 and associated pads 72, 74. Each bracket 80 comprises identical L-shaped halves 82, each comprising a leg 84 secured to the cross piece 32 and a flange 86 projecting at right angles from the gate mounting face. The two flanges 86 on each bracket 80 cooperatively bound a space to closely accept the free ends 78 of the short leg supports 58, 60, to prevent lateral shifting thereof.

To begin assembly, the gate 14 is first placed on the support surface 12 and the mounting face 18 is urged closely against a load such as shown in FIGS. 4-6. A temporary elongate brace 88, as seen in FIG. 12, is situated angularly between the abutting surface 68 on the pad 66 and the support surface at a location spaced from the mounting face 18. The brace can be used to apply pressure on the gate against the load and prevents tipping of the gate during assembly of the structure 10.

Two metal brackets 90, each comprising a U-shaped body 92 and an integral offset flange 94 are attached to the bottom cross piece 28. The U-shaped body is inverted and a surface 96 on the base of the U overlies an upwardly facing surface 98 on the cross piece 28 and, with the bracket 90 so positioned, the flange 94 seats flushly against the support surface 12. The bracket 90 has a plurality of predrilled holes 100 to accept suitable fasteners 102, such as nails or screws, which are directed into the support surface 12. In conventional truck trailers and train cars, the floor normally has a wood covering which facilitates insertion of the fasteners 102. Before the fasteners 102 are inserted, the bottom region of the gate is pushed firmly against the load.

To more rigidly brace the bottom region of the gate, eight identical blocks 104 are attached to the surface 12 with shoulders 106, 108 thereon placed in abutting relationship with the mounting face of the gate. The precise number and configuration of the pads 104 is principally a design consideration. Before the blocks 104 are secured to the support, a force in the direction of arrows 110 in FIG. 13 is applied to the blocks to press the gate firmly against the load.

The long leg supports 50, 52, 54 are assembled as shown in FIG. 14. The ends 70 are placed against the leg abutting surfaces 68 on the pads 62, 64, 66. The opposite ends 112 of the supports are rested on the support surface 12. Blocks 114 are provided to be anchored to the support surface to provide an an abutment for the ends 112 of the long leg supports to prevent shifting thereof. The gate is snugged against the load by applying a pressure in the direction of arrows 116 on the leg supports 50, 52, 54 and simultaneously applying a pressure to blocks 114 in the direction of arrows 118. The blocks 114 are then nailed securely in place on the support surface 12. No fasteners are required at the ends 70 by reason of the ends 70 being firmly pressed against and thereby frictionally held to the surfaces 68.

To complete the assembly of the load support structure, the short leg supports 58, 60 are assembled as shown in FIG. 15. The free end 78 of each support 58, 60 is placed in the space between the bracket flanges 86 and the other end 120 is fit within a brace 122, similar to that shown in FIG. 7 and rested on the support surface 12. The brace flanges 124, 126, 128 rest flushly on the support for a predetermined angular position for said supports 58, 60 and have predrilled holes 130 to accept fasteners 132. With the ends 78 of the short leg supports 58, 60 between the flanges 86 and abutting the surfaces 76 on the pads 72, 74, a force is applied in the direction of arrow 134 at the upper regions of the leg supports and a force is applied in the direction of arrow 136 on the bottom portion of the leg supports 58, 60 to snug the mid portion and lower portion of the gate against the load. Once this has been accomplished, the fasteners 132 are extended through the brace flanges 124, 126, 128 to fix the brace 122 to the surface. The ends 78 of the leg supports 58, 60 are captively maintained between the surfaces 76 on the pads 72, 74 and the flanges 86 on the brackets 80 so that no separate fasteners are required.

It can be seen that fasteners are used only to hold the brackets 90, 122 and blocks 104, 114 to the support surface 112. Consequently, the structure can be disassembled and the gate reused. Assembly is facilitated by having only to nail or otherwise fasten the brackets 80, 122 and blocks 104, 114 to the support surface, which operation is convenient to perform.

Figure 16:
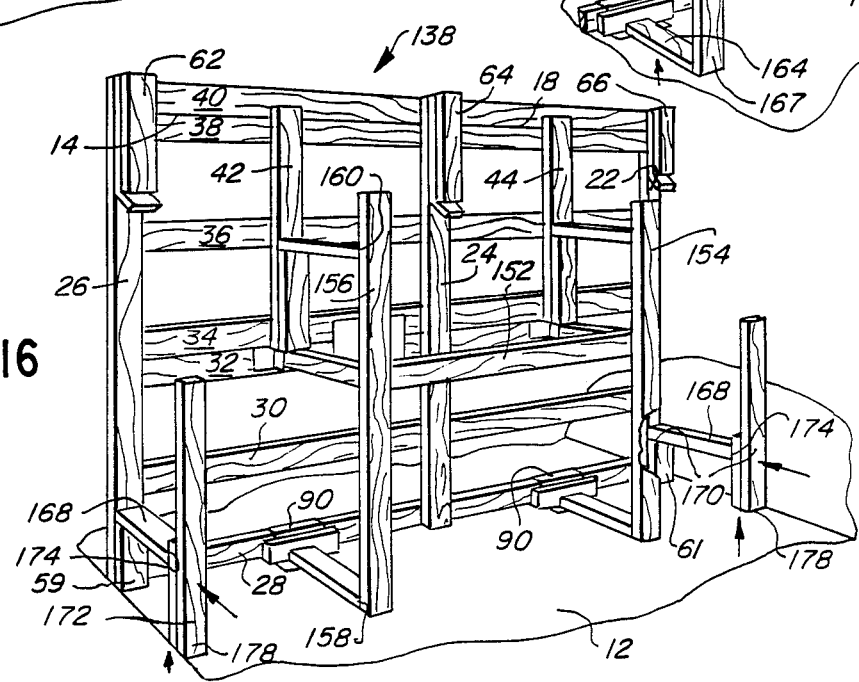
FIG. 16 is a perspective view of a modified form a load bracing structure according to the present invention.

A modified form of the invention is shown at 138 in FIG. 16. The gate 14 is identical to that shown in FIGS. 11-15 and comprises uprights 22, 24, 26, 42, 44, horizontal cross pieces 28-40, bottom corner pads 59, 61 and top corner pads 62, 64, 66.

The gate 14 in the load bracing structure 138 is positioned as the previous embodiment was in FIG. 12. Brackets 90 surround the cross piece 28 and are secured to the support surface 12 as in the prior embodiment. The temporary brace 88 can also be conventionally used during assembly.

After the brackets 90 have been secured, a plurality of blocks 140, 142, 144 are attached to the gate 14 in cantilever fashion. Blocks 140 are nailed to the upwardly facing surfaces 146 on the bottom corner pads 59, 61. Blocks 142 are secured between the flanges 86 on the brackets 90. Blocks 144 are nailed to the upwardly facing surfaces 148 on the pads 72, 74. The blocks 140, 144 have substantially the same length and the length is determined principally by the amount of space available behind the mounting face 18. Pads 150 are mounted to the bottom cross piece 28 over the metal brackets 90 to afford a nailing surface.

Figure 18:
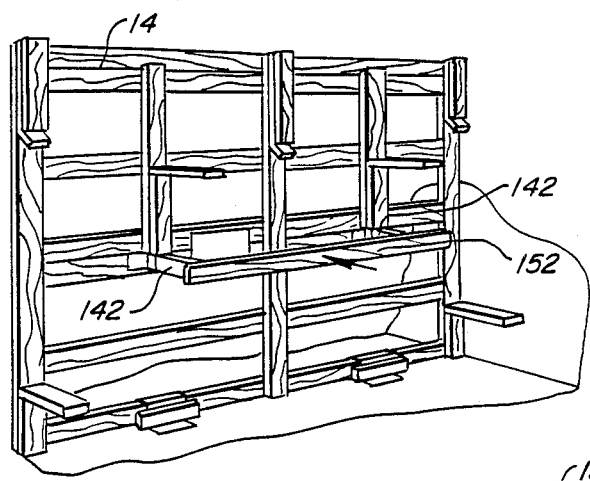

A horizontal cross piece 152, (shown in FIG. 18) spans the distance between blocks 142 and is secured thereto as by nailing or the like. The cross piece 152 rigidifies the connection of the blocks 142 to the gate 14. The blocks 142 are shorter than the blocks 140, 144 by the width of the cross piece 152 so that the free ends 158, 160 of the blocks 140, 144 and surface 162 of the cross piece 152 are vertically aligned.

Elongate, long leg supports 154, 156 are attached to the free ends 158, 160 of the blocks 140, 144 and the cross piece surface 162. Two bottom blocks 164 are provided for connection to the bottom ends 167 of the leg supports 154, 156. Preferably, the supports 154, 156 and pads 164 are preassembled in the L-shape shown in FIG. 19. With the supports 154, 156 connected to the blocks 144 and cross piece 152, pressure in the direction of arrows 166 is exerted to force the structure 138 against the load. Fasteners such as nails 169 can then be directed through the blocks 164 into the support.

It can be seen that the gate 14 can be selectively used as part of each structure 12, 138. The structure 138 is advantageous in environments where a limited amount of space is provided for the bracing structure. The blocks 140, 142, 144, 164 are thus cut to a permissible length.

Figure 19:
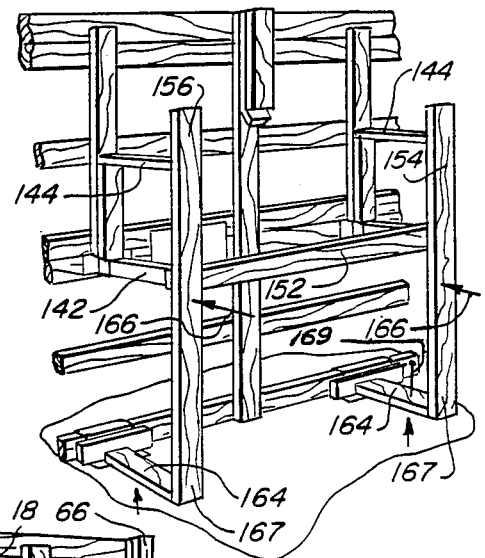

To further rigidify the structure in FIG. 19, blocks 168 (FIG. 16) are mounted on the upper surfaces of the lower corner pads 59, 61 in cantilever fashion. Short leg supports 170, 172 are attached at the free ends 174 of the blocks 168 and are directed vertically from the support 12. The bottom ends 178 of the leg supports 170, 172 bear on the support surface and can be toe nailed or otherwise fastened. As in the prior embodiment, the brackets 90 and long and short leg supports 154, 156 and 170, 172 respectively cooperatively brace the gate 14 at its top and bottom region and firmly secure the gate to the floor for positive bracing of a load acting on the gate mounting face 18.

Other aspects, objects and advantages of this invention can be obtained from a study of the drawings, the disclosure and the appended claims.

I claim:

1. A method of attaching a gate to a horizontal load bearing surface to brace a load on the load bearing surface comprising the steps of:
   providing a gate with top and bottom regions and having a load engaging face, a mounting face facing oppositely to said load engaging face and an upwardly facing surface at the bottom region of the gate;
   placing the gate on the load bearing surface with the load engaging face against a load on the load bearing surface;
   placing a bracket against the upwardly facing gate surface;
   attaching the bracket to the load bearing surface while exerting a force on the bottom region of the gate in a first direction towards said load;
   providing first and second elongate long leg supports each with spaced ends;
   fixing one end of each of the first and second leg supports against the mounting face of the gate at first and second spaced locations at the top region thereof and the other end of each of the first and second leg supports against the load bearing surface at laterally spaced positions, with each laterally spaced position spaced from the mounting face, while exerting a force in said first direction on the top region of the gate;
   providing an elongate short leg support with spaced ends; and
   fixing one end of the short leg support against the mounting face of the gate at a third location below said first and second locations and above said load bearing surface and the other end of the short leg support against the load bearing surface at a position spaced from the gate mounting face while exerting an upward force on said gate,
   whereby said gate is rigidly mounted against the load on said load bearing surface to positively brace said load against movement in a direction opposite to said first direction.

2. The method of attaching a gate according to claim 1 further comprising the step of attaching a block to at least one of said load bearing surface and gate to engage and brace at least one of the ends of at least one of the long and short leg supports.

3. The method of attaching a gate according to claim 1 further comprising the steps of attaching a metal bracket having spaced flanges to at least one of the load bearing surface and gate and locating an end of one of the long and short leg supports between the spaced bracket flanges to prevent shifting thereof transversely to said first direction.

4. The method of attaching a gate according to claim 1 further comprising the steps of placing a block having a shoulder thereon on the load bearing surface with the shoulder against the gate mounting face adjacent the bottom region of the gate and securing the block to the load bearing surface after the bracket is attached.

5. The method of attaching a gate according to claim 4 further including the steps of providing a temporary elongate brace with spaced ends and urging the top region of the gate towards the load by bracing one end of the temporary brace against the mounting face adjacent the top region of the gate and the other end of the temporary brace against the load bearing surface at a location spaced from the mounting face.

6. A structure for bracing a load against shifting on a surface bearing said load, said bracing structure comprising:
   a gate with top and bottom regions and having a load engaging face, a mounting face facing oppositely to said load engaging face and an upwardly facing surface at the bottom region of the gate;
   bracket means for placement against said upwardly facing gate surface and for attachment to the load bearing surface to keep said gate from separating from said load bearing surface;
   block means for attachment to the load bearing surface to abut the bottom region of the gate and maintain the bottom region of the gate against a load;
   at least two laterally spaced elongate long leg supports each having spaced ends; and
   means for attaching one end of each of the long leg supports to the gate at first and second spaced locations at the top region thereof and the other end of each long leg support to the load bearing surface at positions spaced from the gate mounting face.

7. The load bracing structure according to claim 6 further including an elongate short leg support having spaced ends and means for attaching one end of the short leg support to the gate below said first and second locations and the other end of the short leg support to the load bearing surface at a location spaced from the gate mounting face.

8. The load bracing structure according to claim 6 wherein said bracket means comprises a U-shaped body with an outturned flange on one leg of the U, the base of the U has a flat surface to be placed facially against the upwardly facing gate surface and the flange resides adjacent the load bearing surface with the base surface and upwardly facing gate surface facially engaged so that the flange can be attached to the load bearing surface.

9. The load bracing structure according to claim 7 wherein the means for attaching one of the ends of the short leg support comprises a metal bracket with spaced flanges and the short leg support end resides between the spaced flanges.

* * * * *